UNITED STATES PATENT OFFICE.

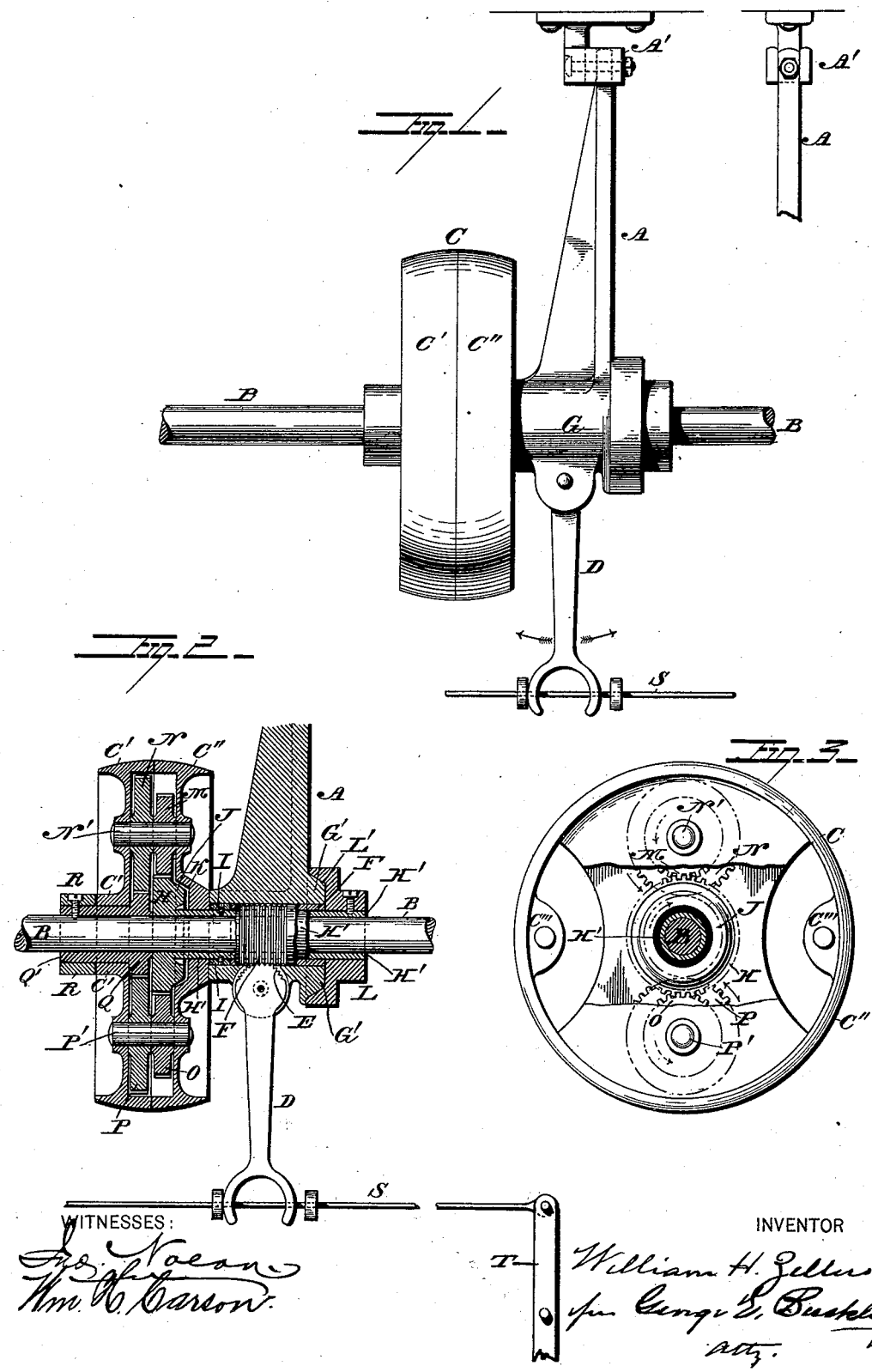

WILLIAM H. ZELLERS, OF PHILADELPHIA, PENNSYLVANIA.

FORWARD AND REVERSE MOTION MECHANISM.

SPECIFICATION forming part of Letters Patent No. 405,290, dated June 18, 1889.

Application filed July 17, 1888. Serial No. 280,192. (No model.)

*To all whom it may concern:*

Be it known that I, WILLIAM H. ZELLERS, a citizen of the United States, and a resident of Philadelphia, Pennsylvania, have invented certain new and useful Improvements in Forward and Reverse Shaft-Motion Mechanism, of which the following is a full and exact description, reference being had to the annexed drawings, making part hereof.
The nature and object of my invention will appear from the following specification and claims.

In the drawings, Figure 1 is a side elevation of my device; Fig. 2, a view partly in longitudinal section and partly in elevation; Fig. 3, an end elevation of a pulley, partly broken away to show the internal construction, the shaft being in cross-section.

A is a hanger sustained by a hinge-joint A' from the ceiling; B, the shaft to which a forward and reverse motion is to be imparted; C, a single pulley formed of two halves C' C'', secured together by bolts C'''. This pulley is adapted to be driven by a single belt; D, a shifting-bar pivoted at its upper end to an ear attached to the shaft-bearing G, which latter is integral with the hanger A. The upper end of this bar is enlarged, and the curved edge of the top of this enlarged part thereof is toothed, as shown at E. Around the shaft B is a loose sleeve F, provided with grooves, as shown. The teeth E of rod D engage with the grooves of sleeve F, whereby lateral motion of the rod will push the sleeve F to and fro on the shaft B.

H is a friction gear-wheel, which, with its sleeve H', is mounted loosely on shaft B. The sleeve H' passes loosely through sleeve F.

I is a steel collar set rigidly around sleeve H' to set and fit in the opening of bearing G; J, a circular male friction-ridge on gear-wheel H, setting in the circular recess K in the inner side of part C'' of the pulley.

L is a friction-block provided with a circular recess L' to receive the circular male friction-ridge G', which latter is integral with bearing G. Friction-block L is secured by a screw to the outer end of sleeve H'.

M is a small gear-wheel, and N a large one mounted rigidly on shaft or gudgeon N'. They are simply rigged so that one will turn the other. They could be bolted together and turn loosely on their shaft.

O P are similar gear-wheels mounted on shaft P', performing the same office by each other. The shafts N' and P' are set loosely in their bearings in the sides C' C'' of the pulley C.

H is a large gear-wheel on shaft B, and Q a small gear-wheel on the same shaft. The wheel Q and its sleeve Q' are set on shaft B, and a collar R on the outer end of sleeve Q' is held in place by a screw passing through the collar and sleeve Q' into the shaft.

The large gear-wheel H engages on one side with small wheel M and on the other with small wheel O, and the small gear-wheel Q engages with the large gear-wheels N and P. The wheels O and P can be dispensed with, if desired, as they only perform the same function as wheels M N. I have shown them here as being used to make a balance, one set with the other.

The operation is as follows: In Fig. 2 the friction-block L is shown to be closely pressed against the ridge G' of stationary bearing G, and the gear-wheel H is thrown away from the inner side of part C'' of the pulley, and steel collar I is pressed against the outer adjacent rim of the pulley. Say gear-wheel H has sixty teeth and small wheel M has thirty. Wheel H is held stationary by the great friction of block L on ridge G'. The wheel M will have to turn twice in one traverse around wheel H. Wheel M is thus revolving very rapidly on its own axis and turning the wheel N with it with equal rapidity. This will revolve wheel Q at a great speed in the opposite direction, and as the sleeve Q' of this wheel is screwed to the shaft B the latter will turn in the same direction as wheel Q. To reverse this motion, the bar D is shifted so as to shift sleeve F against block L and disengage the latter from G', thus relieving friction at that point, and the same motion will, through sleeve H', bring wheel H into frictional contact by ridge J with the recessed side C'' of the pulley at recess K. This will hold wheel H tight against the pulley, and it will travel with the latter, as will the wheels M and N, for they are secured by their shafts in the pulley. Wheel N, thus being held fast, will revolve wheel Q rapidly in a direction the reverse of its former motion, and the shaft B also will, in consequence, be reversed with this wheel. To stop the shaft, the sleeve F is so shifted that block L is freed by a slight space from ridge G' and wheel H is free from contact with the side C'' of pulley C. In this case the pulley will in no way act upon the shaft, as the wheel M will run freely around wheel H, and the latter, being free, will not affect the other parts even if it has a slight motion, and wheel N will turn freely around wheel Q.

My pulley is made in two halves, as shown, in order that the internal parts may be inserted.

S is the actuating-rod for the shifting-bar, and is operated by lever T.

When the pulley C turns freely on the shaft, the latter will be stationary and "idle." The bar D, with its serrated end, may be called a "shifter," and its specific construction, hereinabove described, may be substituted by other forms of shifters well known to mechanics. The face of recess K forms a bearing-surface. The shaft N' may be called a "bar," because if wheels M and N are bolted together they may revolve on the rod N'. It becomes a shaft when they turn with it. The split pulley C may be called a "pulley in sections," adapted to receive the internal mechanism. The shaft B may be hollow or solid, though in practice I use the ordinary shaft.

What I claim as new is—

1. The mechanism for reversing and idling shafts, which consists of pulley C, having surface K, gear-wheel H, with its sleeve H' surrounding said shaft, stationary hanger formed with bearing G and ridge G', friction-block L, secured to said sleeve H', adapted to impinge against said friction-ridge, loose sleeve F, encompassing sleeve H', shifter D, adapted to move sleeve F, which latter is adapted, substantially as shown, to throw block L against ridge G', or to be reversed to throw wheel H against the bearing-surface K of the pulley, gear-wheels M and N, rigged to turn together and to be operated by wheel H, and gear-wheel Q, secured to the shaft and engaging with gear-wheel N, substantially as described.

2. The mechanism for reversing and idling shafts, which consists of pulley C, having surface K, gear-wheel H, with its sleeve H' surrounding said shaft, stationary hanger formed with bearing G and ridge G', friction-block L, secured to said sleeve H', adapted to impinge against said friction-ridge, loose sleeve F, encompassing sleeve H', shifter D, adapted to move sleeve F, which latter is adapted, substantially as shown, to throw block L against ridge G', or to be reversed to throw wheel H against the bearing-surface K of the pulley, small gear-wheel M, engaging with wheel H, large gear-wheel N, rigged to turn with gear-wheel M, and small gear-wheel Q, engaging with gear-wheel N and secured to the shaft, substantially as described.

3. The mechanism for reversing and idling shafts, which consists of pulley C, having surface K, gear-wheel H, with its sleeve H' surrounding said shaft, stationary hanger formed with bearing G and ridge G', friction-block L, secured to said sleeve H', adapted to impinge against said friction-ridge, loose sleeve F, encompassing sleeve H', shifter D, adapted to move sleeve F, which latter is adapted, substantially as shown, to throw block L against ridge G', or to be reversed to throw wheel H against the bearing-surface K of the pulley, gear-wheels M and N, rigged to turn together and to be operated by wheel H, and gear-wheel Q, secured to the shaft and engaging with gear-wheel N, said gear-wheels M and N being mounted on a shaft or bar in bearings in the pulley, substantially as described.

In witness that the above is my invention I have hereunto set my hand.

WILLIAM H. ZELLERS.

Witnesses:
GEORGE E. BUCKLEY,
WM. H. CARSON.